Aug. 23, 1960        P. A. CHILDS ET AL        2,950,156
EQUIPMENT UNIT MOUNTING ARRANGEMENTS
Filed Feb. 15, 1954        2 Sheets-Sheet 1
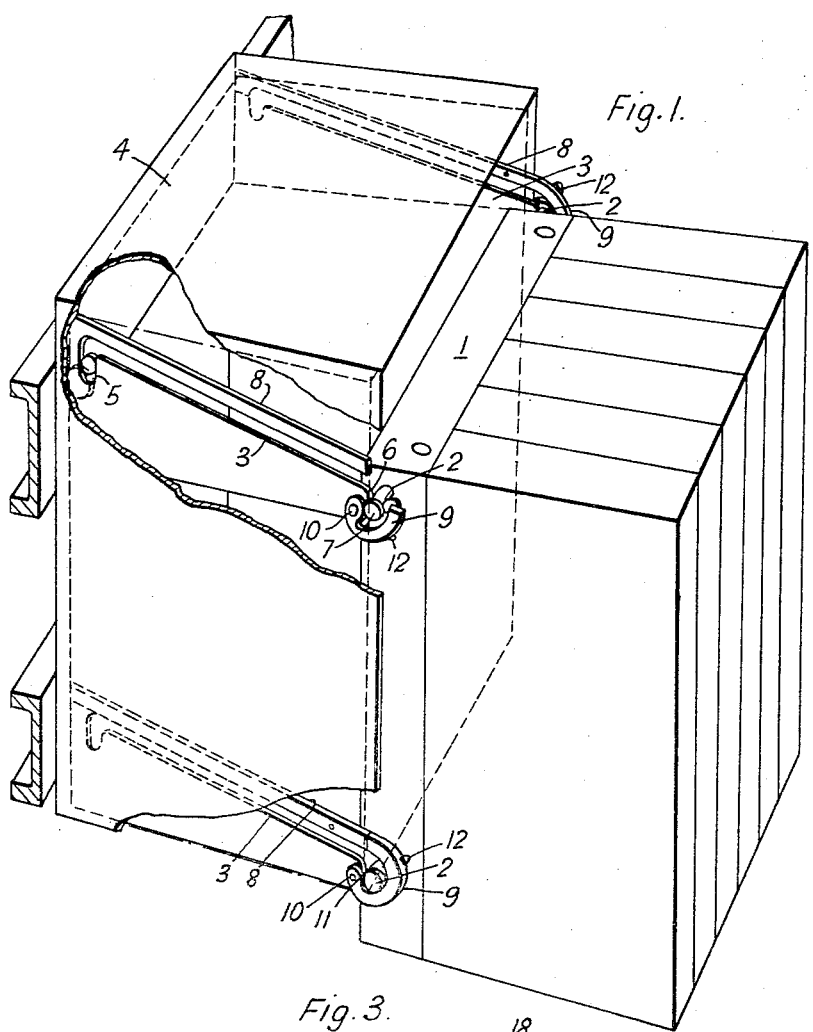
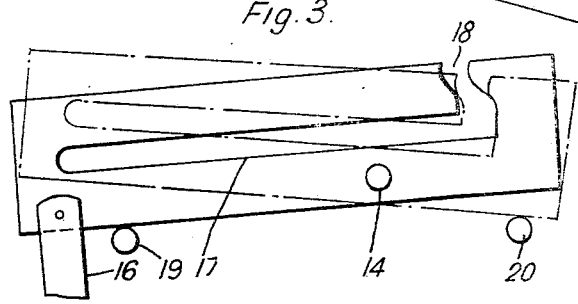
Inventors
P. A. CHILDS · S. F. GOLD ·
W. A. G. WALSH
By Robert Hardleyjr
Attorney

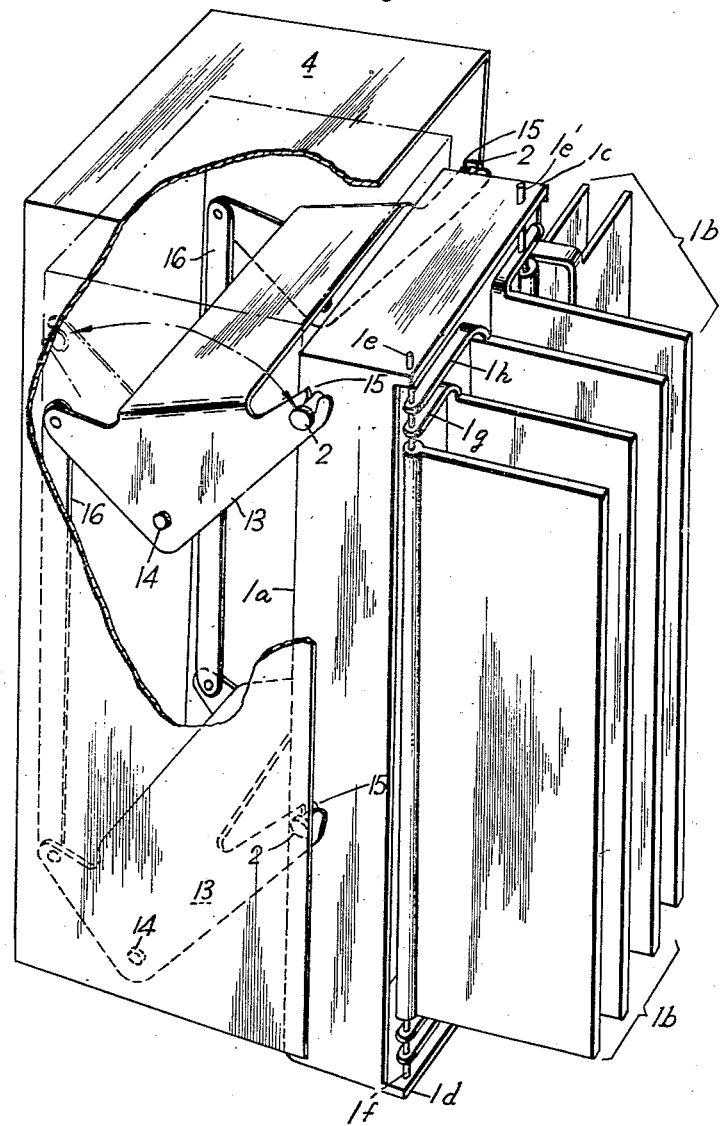

United States Patent Office 2,950,156
Patented Aug. 23, 1960

2,950,156

EQUIPMENT UNIT MOUNTING ARRANGEMENTS

Percy Arthur Childs, Stanley Frederick Gold, and William Arthur George Walsh, London, England, assignors to International Standard Electric Corporation, New York, N.Y.

Filed Feb. 15, 1954, Ser. No. 410,396

Claims priority, application Great Britain Feb. 27, 1953

8 Claims. (Cl. 312—266)

The present invention relates to mounting arrangements for units of equipment and more particularly to arrangements where similar units of equipment are mounted side by side in close proximity to one another.

The chief object of the invention is the provision of an improved mounting arrangement which allows each unit to be moved into a position in which it may be spread or expanded for close inspection and maintenance of the equipment thereon. Such arrangements are particularly desirous in connection with the mounting of electrical equipment such as small electronic components of an electrical circuit such as is used for instance in telecommunication switching equipment.

One feature of the invention consists in an equipment mounting arrangement comprising means for supporting and retaining a unit of equipment in a rear position, means for supporting and detachably retaining said unit of equipment in a forward position, and means for guiding said unit of equipment between said rear and said forward positions.

Another feature of the invention consists in a mounting arrangement for detachably mounting a unit of electrical equipment in which the unit is supported between members each provided with guides for facilitating movement of the unit between two stable positions, one of which positions constitutes the normal operating position of the unit and the other of which positions enables inspection of the electrical equipment of the unit to be made and the unit to be detached.

A further feature of the invention consists in a mounting arrangement for electrical equipment comprising a plurality of similar unit housings in close proximity side-by-side, a unit of electrical equipment for each housing, means in each housing for retaining its unit in either of two extreme positions, one within the housing and the other without the housing, and means in each housing for guiding the unit between said positions and for enabling gravitational force to move the unit from any intermediate position to one of said positions.

These and other features of the invention will be understood from the following description read in conjunction with the accompanying drawings in which:

Fig. 1 is a perspective view, partly cut away, of one method of mounting a unit of equipment;

Fig. 2 is a perspective view, partly cut away, of another method of mounting a unit of equipment with the details of the hinged panels comprising said equipment, and Fig. 3 shows a detail in connection with a suggested modification of Fig. 2.

Referring first to Fig. 1, a unit or book of equipment 1, such for instance as is described in our copending application No. 409,628, filed February 11, 1954, entitled "Multiple Panel Mounting Arrangement," is housed in an open-fronted box 4 which may be provided with a detachable front cover to exclude dust. A number of these box housings may be mounted on a rack closely side by side. The framework of the book of equipment is supported in its housing by supporting members so designed to allow the equipment to rest in either of two stable positions and to be moved when required, from one position to the other.

In the first of these positions, taken up by the equipment in normal service, it is enclosed within the housing, and in the second of these positions, taken up by the equipment when access is required for testing and maintenance, it is withdrawn forward to project out of the housing sufficiently to give the required degree of access. In Fig. 1 the equipment is shown in the forwardly withdrawn or access position and the equipment in the normal position is shown by a chain link outline.

Electrical connections to the equipment are made through a flexible multiple cable from the rack.

The framework of the equipment unit 1 is provided at its rear with four studs 2 projecting from the sides, two near the top, one on each side and two near the bottom, one on each side.

Each of the studs 2 rests on the upper edge of one of four support rails 3 fixed to the insides of the housing 4 (shown partly cut away) to carry the weight of the equipment 1.

Each rail is provided with two notches, one near the back 5, and the other near the front 6, to receive the studs 2 when the equipment 1 takes up either the normal or the access position.

In either of these positions the equipment is firmly located by the studs resting in their notches, out of which the equipment must be lifted before it can be slid along the support rails into the other position.

In order to ease the manipulation of the equipment by hand from one position to the other, the studs are formed with flanged heads 7 to prevent them from disengaging completely from the support rails.

Also, a guard or retaining rail 8 is fixed parallel to each support rail and spaced away from it sufficiently to clear the stud 2 when sliding.

In order further to ease the manipulation of the equipment, the support rails and guard rails are inclined at an angle to the horizontal, sloping down from back to front so that as the equipment slides forward or back it is held substantially upright by the guiding of the studs 2 between the support rails 3 and the guard rails 8.

Any tilting movement of the equipment out of the vertical is limited to the product of the clearance between stud and guard rail, and the cosecant of the angle of inclination to the horizontal.

To enable the equipment to be removed completely from the housing when required, a gap is left between the front end of each guard rail 8 and the front notch 6 in each supporting rail 3, to allow the studs 2 to pass through freely.

This gap is normally closed by a retaining catch 9 pivoting on a stud 10 attached to the housing 4 and so shaped that the retaining edge 11 of the catch 9 forms an arc about its pivot 10, in order that any pressure exerted by the stud 2 against the catch 9 does not tend to move the latter into the open position.

In Fig. 1, the upper left hand catch is shown in the open position and the lower left hand catch is shown in the closed position.

Each retaining catch 9 is fitted with a thumbnail projection 12 by which it can be moved into the closed or open positions.

Referring now to Fig. 2, there is shown in perspective and partly cut away, another method of mounting a unit of equipment including the details of the hinged panels comprising said equipment. There is provided a housing 4 into which the book of equipment 1 is adapted to be pivoted, as will be later explained. The book of equipment 1 may consist of a U-shaped framework 1*a* and two groups of leaves 1*b* and 1*b'*. The framework 1*a* is provided with an upper portion 1*c* and a lower portion 1*d*. Near the ends of the portions 1*c* and 1*d* are provided upper and lower pivots 1*e* and 1*f*, respectively, and 1*e'* and 1*f'*, respectively. Pivot 1*f'* cannot be seen but is in the same relative position on the lower portion 1*d* as is the pivot 1*f*. The leaves 1*b*, 1*b'* are similar to the leaves of a book and opposite sides of each leaf may be considered as a page and are so labeled. Fig. 2 shows but six leaves 1*a*, 1*a'* constituting twelve pages, but it should be understood that more or fewer leaves could be utilized. Each leaf in the group 1*a* is hinged between pivots 1*e* and 1*f* and similarly each leaf of the group 1*a'* is pivoted between the pivots 1*e'* and 1*f'*. The outer leaves constituting page 1 and page 11, respectively, are pivoted in their planes, but the interior leaves are pivoted in spaced planes by means of the offset hinge portions 1*g*, 1*h* and 1*g'*, 1*h'*, respectively. This arrangement enables a predetermined spacing to be maintained between adjacent leaves. The leaves containing pages 9 and 11 are shown in the opened position. It will be understood, of course, that the openings of the leaves may occur only when the equipment 1 is positioned outside the housing 4. As in Fig. 1, the framework is provided with studs 2, which studs rest in the notches 15 in either side of two cradles 13, one upper and one lower, each pivoting on two horizontal bearings 14 fixed to each side wall of the housing 4 which is shown partly cut away. The two cradles 13 are connected by links 16 so that they move in unison keeping the equipment upright. The cradles move through an arc limited by stops not shown, so that the positions at the limits of movement correspond to the position required for normal operation and access, respectively.

Fig. 2 shows the equipment standing in the access position, and the normal operating position is shown by a partial chain-link outline and the arc traversed by one of the studs 2 is shown by a chain-link line.

Since the cradle pivots are placed below the notches supporting the equipment by its studs, the equipment is held by its own weight in either position.

If desired, suitable retaining catches (not shown) may be attached to the cradles 13 at the notches 15 in order that the studs 2 may not accidently be dislodged from their notches in the cradles.

Fig. 3 shows the side of another form of cradle, pivoted at 14 and having a slot 17 open at the forward end as at 18 for the entry of a stud 2. In this case the cradle will rest on back-stops such as 19 when the equipment is in its normal position. When the equipment is drawn forward the cradle will rock when the studs 2 pass over the pivots 14 and will rest, as shown dotted, on front-stops such as 20 with the equipment in the forward position. The equipment may be removed by passing the stud 2 through the openings 18 which may have suitable retaining catches to prevent accidental removal.

While the principles of the invention have been described above in connection with specific embodiments, and particular modifications thereof, it is to be clearly understood that this description is made only by way of example and not as a limitation on the scope of the invention.

What we claim is:

1. Equipment mounting arrangement comprising an open-fronted housing, equipment adapted to normally operate within said housing and to substantially occupy all the space therein, said equipment mounted on a plurality of panels hingedly mounted in book form, support means for supporting said panels in a position having a first vertical plane within said housing and in a second position having a second vertical plane without said housing, said support means coupled to upper and lower portions of opposite interior sides of said housing and adapted to maintain said planes in parallel relation, said support means including guide means for guiding said equipment in an angular direction between said positions whereby said panels may be maintained in closed-book form within said housing and may be pivoted about their hinges to said support means to form an open book without said housing.

2. Equipment mounting arrangement as claimed in claim 1, wherein said support means are fixedly attached to the sides of said housing and said guide means are disposed at an acute angle to said planes.

3. Equipment mounting arrangement as claimed in claim 1, wherein said support means comprise a pair of elements pivotally mounted to the sides of said housing and linkage means coupled between said elements to maintain said elements in angularly rotatable synchronism about their pivotal mounting.

4. Equipment mounting arrangement as claimed in claim 1, wherein said elements each comprise a pair of triangular-shaped members having an inter-connecting piece interconnecting corresponding bases of the shaped members, said linkage means pivotally coupled to a first portion of said shaped members adjacent first base angles thereof, said equipment pivotally mounted to corresponding second portions of said members adjacent the other base angles thereof and opposite to said linkage means, and a pivot coupled to a third portion of said members adjacent the apex angles thereof.

5. A mounting arrangement for electrical equipment comprising an open-fronted housing, a framework, a plurality of panels arranged to carry electrical circuit components, said panels hingedly mounted in book form on said framework, means for movably mounting said framework in said housing so that said framework and panels may be supported and retained wholly either in a first position in closed book form within said housing or in a second position without said housing so that said panels may be pivoted about their hinges to form an open book and give access to the components mounted thereon, said means comprising means for maintaining said framework in either of said positions and means for guiding said framework between said positions, said guiding means adapted to enable gravitational force to move said framework from any intermediate position to one of said positions.

6. A mounting arrangement as claimed in claim 5 in which said guiding means comprises a pair of sloping support rails attached to opposite interior sides of said housing and a pair of cooperating guard rails, each guard rail spaced above a different one of said first mentioned rails to prevent derailment of said framework upon movement thereof from position to position.

7. A mounting arrangement as claimed in claim 5 in which said guiding means comprises a rocking cradle pivotally mounted on opopsite interior sides of said housing.

8. A mounting arrangement for electrical equipment comprising an open-fronted housing, a framework, a plurality of panels arranged to carry electrical circuit components, said panels hingedly mounted in book form on said framework, means for movably mounting said framework in said housing so that said framework and panels may be supported and retained wholly either in a first position in closed book form within said housing or in a second position without said housing so that said panels may be pivoted about their hinges to form an open book and give access to the components mounted thereon, said means comprising means for moving said framework by gravitational force from one intermediate position between said inner first position and outer second position to said inner first position and from another intermediate position between said inner first position and outer second position to said outer second position.

References Cited in the file of this patent

UNITED STATES PATENTS

| | | |
|---|---|---|
| 1,492,309 | Ogden | Apr. 29, 1924 |
| 1,692,064 | Trogner | Nov. 20, 1928 |
| 1,738,172 | Judson | Dec. 3, 1929 |
| 2,046,395 | Manoilovich | July 7, 1936 |
| 2,069,707 | Herman | Feb. 2, 1937 |
| 2,566,064 | Keim | Aug. 28, 1951 |
| 2,618,682 | Thumim | Nov. 18, 1952 |
| 2,655,422 | Gussack | Oct. 13, 1953 |

FOREIGN PATENTS

| | | |
|---|---|---|
| 754,406 | France | Nov. 7, 1933 |
| 321,004 | Italy | Sept. 19, 1934 |